US010779292B2

(12) United States Patent
Comsa et al.

(10) Patent No.: US 10,779,292 B2
(45) Date of Patent: Sep. 15, 2020

(54) METHOD FOR ALLOCATING TRANSMISSION RESOURCES USING REINFORCEMENT LEARNING

(71) Applicant: COMMISSARIAT A L'ENERGIE ATOMIQUE ET AUX ENERGIES ALTERNATIVES, Paris (FR)

(72) Inventors: Ioan-Sorin Comsa, Grenoble (FR); Antonio De Domenico, Grenoble (FR); Dimitri Ktenas, Voreppe (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 106 days.

(21) Appl. No.: 16/166,564

(22) Filed: Oct. 22, 2018

(65) Prior Publication Data

US 2019/0124667 A1 Apr. 25, 2019

(30) Foreign Application Priority Data

Oct. 23, 2017 (FR) .................................... 17 59982

(51) Int. Cl.
*H04W 72/08* (2009.01)
*H04W 72/12* (2009.01)
(Continued)

(52) U.S. Cl.
CPC ......... *H04W 72/085* (2013.01); *H04W 72/04* (2013.01); *H04W 72/0446* (2013.01);
(Continued)

(58) Field of Classification Search
CPC .......... H04W 72/085; H04W 72/1242; H04W 72/1231; H04W 72/0446; H04W 72/04;
(Continued)

(56) References Cited

U.S. PATENT DOCUMENTS 7,751,468 B2 * 7/2010 Des Noes ................. H04L 1/20
375/148
8,155,230 B2 * 4/2012 Ktenas .................. H04L 25/067
370/203

(Continued)

FOREIGN PATENT DOCUMENTS

EP 2 148 478 B1 12/2011
EP 2 936 908 B1 2/2017

OTHER PUBLICATIONS

French Preliminary Search Report dated Jun. 11, 2018 in French Application 17 59982, filed on Oct. 23, 2017 (with English Translation of Categories of Cited Documents).

(Continued)

Primary Examiner — Joshua Kading
(74) Attorney, Agent, or Firm — Oblon, McClelland, Maier & Neustadt, L.L.P.

(57) ABSTRACT

The invention relates to a method for scheduling packets belonging to a plurality of data flow categories in a multi-access telecommunication system sharing a plurality of transmission resources. The method comprises at each transmission time interval, selecting, by a planner (CT, CF) a resource allocation plan and allocating the transmission resources to the data flows in accordance with the selected resource allocation plan. This selection is made by querying a look-up table (LUT) the content of which results from the implementation of a reinforcement learning and which makes it possible to identify, from the current state of the multi-access telecommunication system (s[t]), the resource allocation plan to be selected, this plan being optimum to fulfil heterogeneous needs in terms of quality of service.

7 Claims, 2 Drawing Sheets

(51) Int. Cl.
    H04W 72/04    (2009.01)
    H04W 72/10    (2009.01)
(52) U.S. Cl.
    CPC ....... *H04W 72/0453* (2013.01); *H04W 72/10* (2013.01); *H04W 72/1205* (2013.01); *H04W 72/1231* (2013.01); *H04W 72/1242* (2013.01)
(58) Field of Classification Search
    CPC ............. H04W 72/0453; H04W 72/10; H04W 72/1205
    See application file for complete search history.

(56) References Cited

U.S. PATENT DOCUMENTS

| | | | | |
|---|---|---|---|---|
| 8,245,115 | B2* | 8/2012 | Savin | H03M 13/114 |
| | | | | 714/752 |
| 8,537,801 | B2* | 9/2013 | Calvanese Strinati | |
| | | | | H04L 5/006 |
| | | | | 370/329 |
| 9,220,109 | B2* | 12/2015 | Calvanese Strinati | |
| | | | | H04W 72/0486 |
| 9,647,803 | B2* | 5/2017 | Maret | H04L 1/1829 |
| 2019/0075570 | A1* | 3/2019 | De Domenico | H04W 16/08 |
| 2019/0273641 | A1* | 9/2019 | Cavalcante | H04L 5/0046 |

OTHER PUBLICATIONS

3GPP Technical Specification Group Services and System Aspects, "TS 23.203, Policy and charging control architecture", (Release 14), V14.4.0, 2017, 257 pages.

Santos, E., "A Simple Reinforcement Learning Mechanism for Resource Allocation in LTE-A Networks with Markov Decision Process and Q-Learning", arxiv.org, Cornell University Library, 2017, 6 pages.

Comsa, I., et al., "A Novel Dynamic Q-Learning-Based Scheduler Technique for LTE-Advanced Technologies Using Neural Networks", IEEE 37$^{th}$ Conference on Local Computer Networks, 2012, 4 pages.

Yau, K., et al., "Reinforcement learning models for scheduling in wireless networks", Frontiers of Computer Science, vol. 7, No. 5, 2013, 13 pages.

* cited by examiner

METHOD FOR ALLOCATING TRANSMISSION RESOURCES USING REINFORCEMENT LEARNING

TECHNICAL FIELD

The field of the invention is that of multi-access telecommunication systems offering a plurality of transmission resources. The invention relates to the management of transmission resources and is more particularly concerned with a scheduling implemented in two decoupled steps with first a scheduling in the time domain to select a group of data flows based on needs in terms of quality of service, typically the more urgent data flows, and then a scheduling in the frequency domain taking the state of the transmission channel into account to allocate the radio resources to the data flows of the selected group.

STATE OF PRIOR ART $5^{th}$ generation mobile networks will be characterised by the presence of multiple services the needs of which will be extremely heterogeneous. For example, the services of extreme mobile broadband require very high data rates, ultra-reliable low latency applications require very low latencies and very low error rates, and massive machine-type communication services will impose the presence of a very significant density of user connections. These different needs are often contradictory and the joined optimisation of these needs is a difficult problem to solve.

The OFDMA (Orthogonal Frequency Division Multiple Access) technique allows a fine-grained allocation of the radio resource where each resource unit RB (Resource Block) unit can be allocated and modulated adaptatively to make use and take advantage of the frequency diversities of each user. To fulfil the heterogeneous needs in terms of Quality of Service (QoS) of the different services of a $5^{th}$ generation network, a flexible radio resource management (RRM) is necessary.

The management of the radio resource makes use of a packet scheduler which supports sharing the radio resource between the different active users at each transmission time interval. This scheduler has a set of scheduling rules used to control the parameters such as transmission power, coding and modulation scheme and the allocated bandwidth. The aim is to use as efficiently as possible the radio resources to increase the spectral efficiency, while ensuring to the users the service level required by each traffic request.

The four following types of scheduling rules can be distinguished.

"Unknown channel/unknown QoS" type rules. These rules are characterised by a very simple implementation requiring neither knowledge of a channel quality indicator (CQI) nor QoS measurements. For example, a Round-Robin type scheduler allocates an identical bandwidth to each active user;

"Unknown channel/Known QoS" type rules. These rules aim at fulfiling needs in terms of QoS without taking the CQI information into account. For example, the EDF (Earliest to Deadline First) rule assigns a priority which is all the greater to a packet as its sending delay is close, without any consideration of the channel state;

"Known channel/unknown QoS" type rules. These rules provide good compromise between performance and complexity taking the diversity of users into consideration. Their performance remains however subjected to the reliability of the CQI information. The MCI (Maximum Carrier to Interference) rule can in particular be mentioned, which aims at maximising the instantaneous total rate;

"Known channel/known QoS" type rules. These rules take both QoS and CQI information into consideration. PF-BF (Proportional Fair—Barrier Function), PF-EXP (Proportional Fair—EXPonential) and PF-OPLF (Proportional Fair—Opportunistic Packet Loss Fair) can in particular be mentioned, which are respectively in charge of ensuring a rate, minimising delays and reducing packet loss rate.

None of these rules can be considered as the most appropriate solution for all the network conditions and all the QoS needs. To fulfil delay requirements, a scheduling with two decoupled steps has been proposed with first a scheduling in the time domain to select a group of packets based on needs in terms of quality of service, typically the most urgent packets, and then a scheduling in the frequency domain taking the state of the transmission channel into consideration to allocate the radio resources to the packets of the selected group. Such a scheduling is for example known from patents EP 2 148 478 B1 and EP 2 936 908 B1. But these scheduling solutions do not enable multiple traffic categories having different needs in terms of QoS to be differentiated.

DISCLOSURE OF THE INVENTION

The purpose of the invention is to provide a method for scheduling packets belonging to a plurality of packet categories in a multi-access telecommunication system sharing a plurality of transmission resources, capable of treating heterogeneous data flows while being able to offer optimum performance in terms of fulfiling QoS requirements.

To that end, the invention provides a method which comprises, for a state of the multi-access telecommunication system, determining, by iterations of a reinforcement learning, a resource allocation plan maximising a reward sum. Each iteration of the reinforcement learning comprises:

allocating the transmission resources to the data flows according to a resource allocation plan;

transmitting the packets by means of the allocated transmission resources;

for each of the data flow categories, calculating at least one transmission performance indicator of each of the data flows of the category, and comparing, for each of the data flows of the category, the calculated at least one transmission performance indicator with a threshold representative of a quality of service requirement relating to the at least one transmission performance indicator for the category, and determining a reward as a function of the result of said comparison for each of the data flows of each of the categories.

Some preferred but not limiting aspects of this method are the following ones:

the resource allocation plan comprises a hierarchisation rule and at least one first and one second scheduling rule, the transmission resources allocation comprising two steps consisting in:

a scheduling in the time domain made by a time classifier configured to hierarchise the data flow categories according to the hierarchisation rule into at least one priority category and one secondary category; and a scheduling in the frequency domain made by a frequency classifier configured to:

schedule the data flows of the priority category according to the first scheduling rule and allocate transmission resources to the data flows of the priority category as they are scheduled; and in case of remaining resources, schedule the data flows of the secondary category according to the second scheduling rule and allocate the remaining transmission resources to the data flows of the secondary category as they are scheduled.

each iteration of the reinforcement learning comprises:

according to a probability $P_{a*}$, an exploitation selection consisting in selecting the resource allocation plan maximising the reward sum at this stage of iterations; and according to a probability $P_{a*}$, an exploration selection consisting in selecting a resource allocation plan different from the resource allocation plan maximising the reward sum at this stage of iterations.

the at least one transmission performance indicator is one from a transmission delay, a transmission rate and a transmission loss rate.

BRIEF DESCRIPTION OF THE DRAWINGS

Further aspects, purposes, advantages and characteristics of the invention will be better apparent upon reading the following detailed description of preferred embodiments thereof, given by way of non-limiting examples, and made in reference to the appended drawings in which.

DETAILED DISCLOSURE OF PARTICULAR EMBODIMENTS

Figure 1:
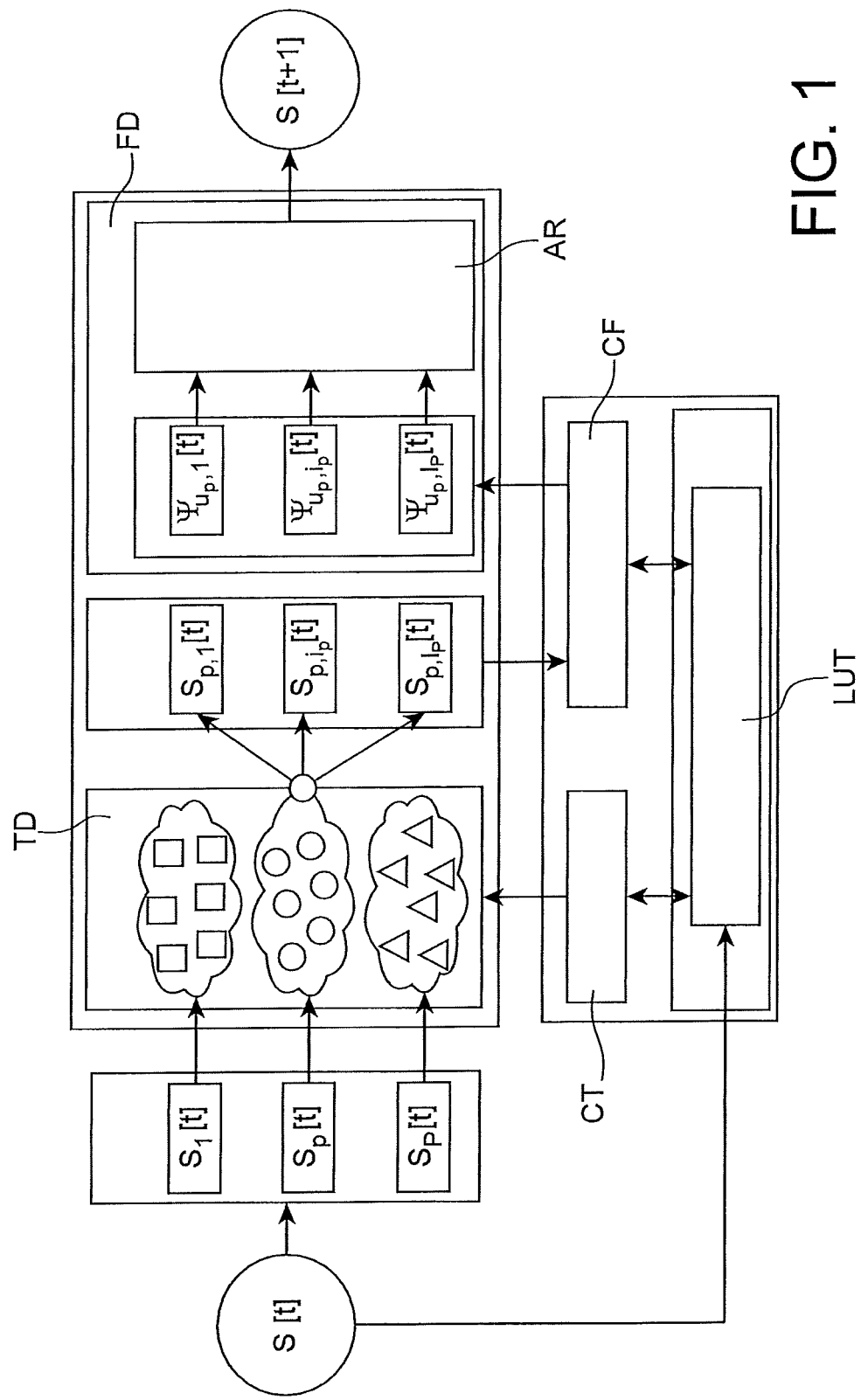
FIG. 1 is a scheme illustrating a method for scheduling packets making use of a look up table (LUT) the content of which results from the implementation of a reinforcement learning.

The invention addresses the scope of a multi-access telecommunication system where a plurality of users and/or applications have access to common transmission resources, and in which, for each access, data are transmitted as packets. A typical example of use of the invention is that of an OFDMA system in which the available bandwidth is divided into $N_{RB}$ resource units RB (Resource Block) where a resource unit RB represents the minimum amount of frequency resources that a base station can allocate at each transmission time interval (TTI).

Within the scope of the invention, the telecommunication system offers its transmission resources to P categories of data flows (in what follows, a data flow is associated with a user). $T_C=\{1 \ldots P\}$ thus denotes all the data flow categories. Each category $p \in T_C$ is characterised by a set of active users $UE_P=\{1 \ldots I_p\}$ (i.e. a set of data flows) and a set of specific objectives and requirements in terms of QoS, noted $O_p=\{1 \ldots N_{O_p}\}$, this set $O_p$ comprising for example a guaranteed bit rate (GBR), a delay, a packet loss rate (PLR).

In order to efficiently schedule heterogeneous data flow categories having different priorities, the invention makes use of a planner configured to, at each transmission time interval, select a resource allocation plan and make an allocation of the $N_{RB}$ transmission resources to the data flows in accordance with the selected resource allocation plan. In a favoured embodiment represented in FIG. 1, the planner is configured to make a scheduling in two decoupled steps, with first a step of scheduling in the time domain TD and then a step of scheduling in the frequency domain FD. As will be detailed in the following, the resource allocation plan comprises in this case a hierarchisation rule and at least one first and one second scheduling rules.

At a TTI transmission interval t, the telecommunication system has a current state s[t] and each data flow category $p \in T_C$ has a current state $s_p[t]$. The scheduling in the time domain is made by a time classifier CT configured to make the selection of a hierarchisation rule and the hierarchisation of the data flow categories according to the selected hierarchisation rule into at least one priority category and one secondary category. The time classifier CT thus hierarchises data flow categories as a function of their current states and iteratively forwards them to a frequency classifier CF, from the highest priority category to the lowest priority category, to define the scheduling in the frequency domain.

A possible hierarchisation strategy consists in determining the scheduling of the data flows according to a priority level which corresponds to each flow, as defined for example in table 6.1.7 of 3GPP Technical Specification Group Services and System Aspects, "TS 23.203, Policy and charging control architecture", (Release 14), V14.4.0, June 2017. Another possible strategy is the hierarchisation of the data flows giving priority to the GBR (guaranteed bit rate) flows, versus the non-GBR (not guaranteed bit rate) flows.

In the example of FIG. 1, it is the category p which is selected as a priority category.

The scheduling in the frequency domain is made by the frequency classifier CF which makes use as an input the state of the users $\{s_{p,1}[t], \ldots, s_{p,I_p}[t]\}$ of the selected category p. The frequency classifier is configured to carry out:

selecting a first scheduling rule, making a scheduling of the data flows of the priority category according to the selected first scheduling rule and allocating resources to the data flows of the priority category which are scheduled in accordance with the first scheduling; and in case of remaining resources, selecting a second scheduling rule, making a scheduling of the data flows of the secondary category according to the selected second scheduling rule and allocating the remaining resources to the data flows of the secondary category which are scheduled according to the second scheduling.

The frequency classifier FC thus selects the most appropriate scheduling rule $u_p$ from $N_R$ possible rules ($u_p \in U=\{0, 1, \ldots, N_R\}$) to improve QoS of the data flows of the priority category p. Here, $u_k=0$ indicates that the category k is not scheduled because of the absence of remaining resources. Examples of scheduling rules have been given in the introductory part.

The application of the most appropriate scheduling rule $u_p$ provides for each user $i_p \in UE_p$ of the selected category p his/her priority $\Psi_{u_p,i_p}$ in the resource allocation scheme. The resource allocation RA is iteratively made by allocating a resource unit RB available to the user with the highest priority, either until there are no more available resources (i.e. all the resource units RB have been allocated) or until all the users $i_p \in UE_p$ in the priority category p have been served (i.e. there are no more data to be transmitted for this data flow category). In the latter case, if there are remaining resources, the time classifier CT forwards the data flows of the highest secondary category to the frequency classifier CF. And so on as long as all the resource units RB have not been allocated or all the users of all the categories have not been served. $J=\{J_1[t], \ldots, J_P[t]\}$ denotes the set which describes the number of resource units RB allocated to each TTI t to each of the categories $p \in T_C$.

Within the scope of the invention, the planner is configured to query a look up table LUT in order to identify, from the current state s[t] of the multi-access telecommunication system, the resource allocation plan to be implemented. Within the scope of the favoured embodiment, one or both of the time CT and frequency CF classifiers is/are configured to perform, at each transmission time interval TTI, the querying of the look up table LUT to identify, from the current state s[t] of the multi-access telecommunication system, respectively, the hierarchisation rule and/or the first scheduling rule $u_p$ (and optionally the scheduling rule(s) applicable to the secondary category(ies) being resource-allocated) to be selected.

According to a first aspect, the invention is concerned with creating the look up table. More particularly, it relates to a method for determining a resource allocation to packets belonging to a plurality of data flow categories in a multi-access telecommunication system sharing a plurality of transmission resources, this method comprising, for a state of the multi-access telecommunication system, determining, by iterations of a reinforcement learning, an allocation of resource maximising a reward sum.

Each iteration of the reinforcement learning comprises:
allocating transmission resources to the data flows according to a resource allocation plan;
transmitting the packets by means of the allocated transmission resources;
for each of the data flow categories, calculating at least one transmission performance indicator (KPI for Key Performance Indicator) of each of the data flows of the category, and comparing, for each of the data flows of the category, at least one calculated transmission performance indicator (noted $x_{p,i_p,o}$) with a threshold (noted $\bar{x}_{p,o}$) representative of a quality of service QoS requirement relating to at least one transmission performance indicator for the category, and
determining a reward as a function of the result of said comparison for each of the data flows of each of the categories.

Thus, to make it possible to fulfil requirements in terms of QoS of heterogeneous data flow categories, the invention uses a reinforcement learning to learn the optimum resource allocation plan to be implemented by the planner. Within the scope of the favoured embodiment, the reinforcement learning makes it possible to determine the hierarchisation rule and/or optimum scheduling rules to be implemented respectively by the time classifier which dynamically hierarchises the different data flow categories and by the frequency classifier which selects the most appropriate scheduling rule to allocate transmission resources to the activated data flow category (i.e. first the priority category and then the secondary categories according to the hierarchisation made by the time classifier).

In one embodiment, both time and frequency classifiers make use of a look up table from a reinforcement learning.

In another embodiment, only the frequency classifier makes use of a look up table from a reinforcement learning. This learning enables the most appropriate strategy to allocate transmission resources to the different data flow categories to be learned and thus the scheduling rule to be applied to a given category to be determined in order to optimise QoS. In such a case, the time classifier can be relatively simple, and for example implement a Round-Robin type strategy or a strategy based on fixed priorities for the data flow categories (such that a first category is only treated by the frequency classifier when the higher-priority categories have no data to transmit).

In yet another embodiment, only the time classifier makes use of a look up table from a reinforcement learning. This learning enables, for a current state of the system s[t], the most appropriate hierarchisation rule of the data flow categories to be determined. In such a case, the frequency classifier can be relatively simple, and for example implement the MCI strategy or EDF strategy.

The implementation of the reinforcement learning within the scope of the favoured embodiment in which both classifiers make use of a look up table from such a learning is described in the following.

Generally, the object of the reinforcement learning is to learn, from experiments, what should be done in different situations, so as to optimise a quantitative reward over time. At each instant t, a controller observes the full state of the system s and performs a given action a. At instant t+1, the controller observes a new state s' and receives a reward r which evaluates the optimality of the previous action. The controller passes through a set of transitions (i.e. from one state to another) and explores all the possible state-action pairs until it determines the decisional behaviour (called strategy or policy, and which is a function associating the current state to the action to be executed) being optimum in that it maximises the reward sum over time.

Let S be the state space of the system, and $s=[s_1, \ldots, s_P] \in S$ the current state of the system, which describes the state of each of the data flow categories. The state sp of the category p is defined by the state of each of its users, $s_p=[s_{p,1}[t], \ldots, s_{p,I_p}[t]]$. The elements which describe the state of each category can be separated into uncontrollable elements and controllable elements depending on whether they depend or not on the action performed by the controller. Thus, $s_p=(s_p^C, s_p^U)\ \forall p \in T_c$ is noted with $s_p^C$ a controllable state and $s_p^U$ an uncontrollable state. The uncontrollable state $s_p^U$ includes the number of active users per category, the CQI indicators of the users and their data inflow rate. The controllable state is characterised by the instantaneous transmission performance indicators KPI (Key Performance Indicator) of the users and their deviations from the QoS requirements. The $N_{O_p}$ instantaneous indicators KPI (one or more of a transmission delay, a transmission rate and a transmission loss rate for example) of a user $i_p$ of the category p can be described by the vector $$x_{p,i_p}[t] = [x_{p,i_p,1}[t], \ldots, x_{p,i_p,N_{O_p}}[t]].$$

The QoS requirements of the category p towards these indicators KPI can be described by the vector $$\bar{x}_p = [\bar{x}_{p,1}, \ldots, \bar{x}_{p,N_{O_p}}],$$

with $\bar{x}_{p,o}$ a threshold representative of a quality of service requirement QoS relating to the transmission performance indicator o for the category p. Thus, for each user, the controllable state is written as $s_{p,i_p}^C[t]=(x_{p,i_p}[t], \bar{x}_p - x_{p,i_p}[t])$.

$A = A_{CT} \times A_{CF}$ denotes the set of possible actions of the controller of the reinforcement learning, with $A_{CT}$ the set of actions corresponding to the time classifier and $A_{CF}$ the set of actions corresponding to the frequency classifier. More specifically, $A_{CT} = \{A_{CT,1}, \ldots, A_{CT,N}\}$ is a set with a size N=P!, where each action corresponds to a possible hierarchisation of the P data flow categories. And $A_{CF} = \{1, \ldots, N_R\}$ is a set of scheduling rules with a size $N_R$, where the action $i \in A_{CF}$ corresponds to the selection of the ith scheduling rule. Thus, $a=\{a_{CT}, a_{CF}\} \in A$ is the pair of actions consisting of the actions made by each of the classifiers.

The reward function R calculates the optimality to apply the action a from a state s. It takes into consideration, for each of the data flows of each of the categories and for each performance indicator, the deviation between the instantaneous indicator of the data flow and the threshold representative of a quality of service requirement relating to the indicator for the category to which the data flow belongs.

This reward function for the time classifier can be determined as $R(s, a_{CS}, a_{RS}) = \sum_{p=1}^{P} r_p(s_p, a_{CS}, u_p)$, where $r_p(s_p, a_{CS}, u_p)$ is the reward received at the frequency classifier when the scheduling rule $u_p$ is used for the category p with the state $s_p$, given the selection of the hierarchisation rule $a_{CS}$. Thus, the reward which is received at the time classifier corresponds to the sum of all the rewards of the frequency classifier. At the frequency classifier, the reward function can be determined as $$r_p(s_P, a_{CS}, u_p) = \sum_{i_p=1}^{I_p} \sum_{o=1}^{N_{O_p}} (1 - |\bar{x}_{p,o} - x_{p,i_p,o}|),$$

namely as being the reward sum for each user $i_p \in UE_p$ and for each indicator KPI $o \in O_p$.

According to the invention, the reinforcement learning can make a compromise between exploitation and exploration, where exploitation consists in remaking the actions which, depending on the acquired experience, will maximise the cumulated reward and where exploration consists in looking over (state, action) couples in searching for a larger cumulated reward, with the risk of assuming sometimes a sub-optimal behaviour. More particularly, the reinforcement learning retains a compromise between exploration and exploitation which consists in following the current optimal policy most of the time, while choosing a random action more or less regularly.

Thus, the reinforcement learning according to the invention comprises at each of the iterations:
- according to a probability $P_a$, an exploitation selecting consisting in selecting a resource allocation plan (the hierarchisation rule and/or the first scheduling rule in the favoured embodiment), defined by the action a, maximising the reward sum at this stage of iterations; and
- according to a probability $P_{a*}$, an exploration selecting consisting in selecting a resource allocation plan (the hierarchisation rule and/or the first scheduling rule in the favoured embodiment) which is potentially sub-optimal, defined by the action $a* \neq a$.

In a first possible embodiment, the mechanism called $\varepsilon$-greedy is adopted, according to which $P_a = 1-\varepsilon$, $\varepsilon$ being positive and strictly lower than 1, and $$P_{a*} = \frac{\varepsilon}{K-1},$$

where K is equal to N or $N_R$ depending on whether the hierarchisation rule or the scheduling rule is considered. Alternative solutions to this mechanism exist (for example the Boltzmann exploration) which, during an iteration, associate with each action a a probability of being chosen as a function of rewards received at the previous iterations, when this action is selected in the state s.

Figure 2:
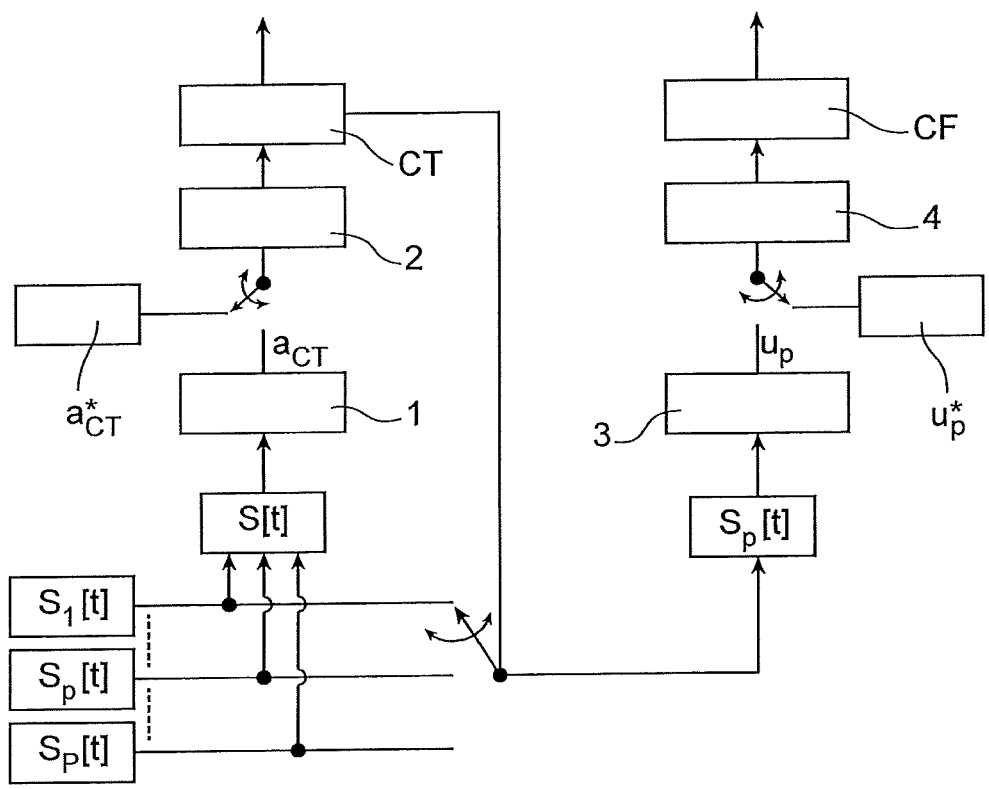
FIG. 2 is a scheme illustrating a possible embodiment for the reinforcement learning implementing an exploitation/exploration compromise.

Coming back to the example where both classifiers make use of an optimised look up table via the reinforcement learning, the implementation of the exploration/exploitation compromise is illustrated by FIG. 2. In this Fig., the state of the system at instant t s[t] is provided to a first reinforcement learning module 1 in charge of determining the optimum policy in terms of hierarchisation of the data flow categories. A first exploitation/exploration compromise module 2 will select, according to the $\varepsilon$-greedy mechanism, with a probability $1-\varepsilon$, the action $a_{CT} \in A_{CT}$ determined by the first reinforcement learning module 1 based on the policy learnt at this stage of iterations and, with a probability $\varepsilon$, a random action $a*_{CT}$.

The time classifier CT then successively provides the different data flow categories to the frequency classifier as a function of the selected hierarchisation rule (i.e. depending on the selected action $a_{CT}$ or $a*_{CT}$). An iterative process then starts, which is completed when all the data flow categories have been served or when the entirety of the resources has been allocated.

If depending on the selected action $a_{CT}$ or $a*_{CT}$, the category p is to be scheduled at the nth iteration of this process, the state $s_p$ of the users belonging to this category p is provided to a second reinforcement learning module 3 in charge of determining the optimum policy in terms of user scheduling. A second exploitation/exploration compromise module 4 will select, with a probability $1-\varepsilon$, the action $a_{CF} = u_p$ determined by the second reinforcement learning module 3 based on the policy learnt at this stage of iterations and, with a probability $\varepsilon$, a random action $u*_p$. As for the first module 2, mechanisms other than the $\varepsilon$-greedy (such as the Boltzmann exploration) can be selected to optimise the compromise between exploration and exploitation.

Then, a reward $r_p(s_p, \{a_{CS}, a*_{CT}\}, \{u_p, u*_p\})$ is associated with the selected action $u_p$ or $u*_p$. The set of the actions $u_p$ or $u*_p$ implemented for each of the P categories is noted $a_{CF}$. When the iterative process is completed (when all the data flow categories have been served or when the entirety of the resources has been allocated), an overall reward $R(s, \{a_{CT}, a*_{CT}\}, a_{CF})$ which depends on the rewards received for each category is associated with the action $a_{CT}$ or $a*_{CT}$ implemented by the time classifier CT. This overall reward is used to update the reinforcement learning modules 1, 3. This updating typically makes use of the difference between the expected reward which is based on the passed experiment and the new reward. When this difference becomes low enough (for example lower than $10^{-3}$), the learning process can be stopped and the learned policy can be stored in the look up table LUT. The classifiers CT and CF can then simply look up this table to select the optimum hierarchisation and scheduling rules for a given current state of the telecommunication system. It will be noted that in a possible embodiment described after, the function relating the state to the action is approximated by an approximation function, and the coefficients of the approximation function are stored in the look up table instead of the optimum policy.

Different alternative embodiments will be described in the following.

Representation of the System State

In order to reduce the complexity of the solution provided by the invention and to speed-up the learning process, different alternative embodiments can be implemented, independently or jointly, to simplify the representation of the system state. As previously mentioned, this state is comprised of controllable elements and uncontrollable elements.

These alternative embodiments specifically aim at efficiently representing the state as a function of this classification.

Compression of the Controllable State Space

According to this alternative, the variables of the controllable state sp (for example delay, rate and packet loss rates) of each of the data flow categories are statistically treated, for example to calculate the average and variance thereof. In this manner, the controllable state is no longer dependent on the number of users $I_p$ in each of the data flow categories. The dimension of the state is thus reduced from $\Sigma_{p \in T_C} I_p \cdot O_p$ to $\Sigma_{p \in T_C} 2 \cdot O_p$.

Compression of the Uncontrollable State Space

According to this alternative, the variables of the uncontrollable state sp of each of the categories are statistically treated so as to reduce the size of this state. For some parameters, as for the CQI indicator, it is possible to remove the dependence on the number of users $I_p$ in the category and to the bandwidth (i.e. the numbers $N_{RB}$ of available resource units). On the contrary, for other parameters, as the characteristics of the data flow, it is only possible to remove the dependency on the number of users. Clustering or classification algorithms can be used to that end. Among the clustering algorithms, Lloyd or Swap heuristics can be mentioned. Among the classification algorithms, support vector machines (SVM) or radial basis function based neural networks (RBFNN) can be mentioned.

Reward

An example of calculating a reward function has been presented in what precedes. However, other functions can be calculated, all being dependent on the KPI indicators and QoS requirements. The reward assigned to the time classifier can for example be normalised by the number of data flow categories, whereas the reward assigned to the frequency classifier can for example be normalised by the number of users and the number of KPI indicators in the category being considered.

Reinforcement Learning Techniques

Many reinforcement learning techniques have been proposed in the literature and can be used to create the look up table. Generally, the object of a reinforcement learning is to identify the policy $\pi$ which minimises (respectively maximises) the expected value of a certain function $J(\pi)$ representative of a cost (respectively a reward) associated with achieving the policy $\pi$.

This function $J(\pi)$ can represent a sum of devaluated rewards:

$$J(\pi) = E\left\{\sum_{t=0}^{\infty} \gamma^t r_{t+1} \mid s_0, \pi\right\},$$

where $s_0$ is the initial state, $r_{t+1}$ is the reward received when the policy $\pi$ is implemented starting from state $s_0$ and $\gamma \in [0; 1]$ is a devaluation rate which determines the current value of future rewards.

The function $J(\pi)$ can also be represented as an average reward according to:

$$J(\pi) = \lim_{n \to \infty} \frac{1}{n} E\left\{\sum_{t=0}^{n-1} r_{t+1} \mid \pi\right\}.$$

Further, the reinforcement learning algorithms can be divided into three groups: pure critic, pure actor, actor-critic.

"Pure Critic" Methods

These methods learn the optimum strategy $\pi$ by using a function $Q^\pi(s,a)$ which evaluates the value of each state-action pair (s,a) whereas there is no explicit function to represent and evaluate the currently learnt policy. When the object is to maximise a devaluated reward sum, $Q^\pi(s,a)$ can be defined according to:

$$Q^\pi(s, a) = E\left\{\sum_{t=0}^{\infty} \gamma^t r(s_t, a_t) \mid s_0 = s; a_0 = a, \pi\right\}.$$

According to the Bellman optimality equation, the optimum value $Q^*(s,a)$ can be calculated recursively as follows:

$$Q^*(s, a) = E\left\{r(s, a) + \gamma \max_{a' \in A} Q(s', a') \mid s, a\right\}$$

where s' is the next state observed when the action a has been applied in the presence of the state s. After convergence, it is possible to determine the optimal action a* for the current state s, such that $Q^*(s,a)$ is maximum:

$$a^* = \operatorname{argmax}_{a' \in A} Q^*(s,a).$$

Finally, the optimum state-action pairs are stored in the look up table.

"Pure Actor" Methods

These methods operating with a family of parametric polices aim at optimising the function $J(\pi)$ directly on the parameter space of the policy. A performance gradient, with respect to the actor parameters, is directly estimated by simulation, and the parameters are updated in an improvement direction. The "pure actor" methods have the advantage with respect to "pure critic" methods of allowing the policy to generate actions in a completely continuous action space.

Let us consider a parameterisation of the policy $\pi$ by the parameter vector $\theta$. $J(\pi)$ is a function of the parametric policy $\pi_\theta$, and is a function of $\theta$. The J gradient with respect to $\theta$ is described as:

$$\nabla_\theta J = \frac{\partial J}{\partial \pi_\theta} \frac{\partial \pi_\theta}{\partial \theta}.$$

Then, by using conventional optimisation techniques (such as the gradient descent), a locally optimum solution of the function J can be identified. A drawback of the "pure actor" approach is that the estimated gradient can have a significant variance, which increases the duration required for learning.

"Actor-Critic" Methods

These methods aim at combining advantages from "pure actor" and "pure critic" methods. As for the "pure actor" methods, these methods are capable of prescribing continuous actions, whereas the significant variance of the "pure actor" methods is counterbalanced by adding a critic the role of which is to evaluate the current policy prescribed by the actor.

Function Approximating the Reinforcement Learning

The state-action space can turn out to be combinatory and huge. The problem is thereby not only the amount of memory necessary for the look up table, but also the time and data necessary to perform the optimum policy learning.

Approximation by a Linear Function

It is possible to resort to an approximating function $\hat{J}(\cdot,\theta)$ in the form of a linear function of a weight vector $\theta$. Thereby, a characteristic vector $\varphi(s) \triangleq (\varphi_1(s), \ldots, \varphi_n(s))^T$ having the same number of components as $\theta$ at corresponds to each state s. There are many manners for elaborating characteristics from the states, for example the Fourier base function or tile coding. Generally, the approximating function is given by the scalar product between $\theta$ and $\varphi(s)$: $\hat{J}(\cdot,\theta) = \theta^T \cdot \varphi(s) = \sum_{i=1}^{n} \theta_i \cdot \varphi_i(s)$.

The individual functions $\varphi_i$ are called base functions because they form a linear base for all the linear functions of this form. Constructing a characteristic vector with n dimensions to represent the states is equivalent to selecting a set of n base functions. It is natural to use a stochastic gradient descent with a linear function approximation to iteratively update $\theta$ until convergence.

Approximation by Means of a Fuzzy Interference System

To efficiently represent the state of a system, a well-known solution consists in integrating a fuzzy inference system (FIS) in the Q-learning algorithm. The FIS system is based on the fuzzy logic in which, unlike the standard logic, the truth of any affirmation is a matter of degree, i.e. is noted by a value between 0 and 1. On the other hand, the FIS system uses linguistic variables, namely variables the values of which are words, as "high" or "low". Each linguistic variable $x_i$ is associated with a set of terms $T(x_i)$ which includes all the fuzzy sets corresponding to the linguistic values of $x_i$. The learning phase comprises three phases: fuzzification, truth value calculation and defuzzification.

Approximation by a Neural Network

The neural networks are a powerful tool to estimate the optimum function $\hat{J}(\cdot,\theta)$. As for the linear approximation approach, during the learning phase, at iteration i, the new weights $\theta_i$ are calculated such that the root mean square error in the Bellman equation is reduced. However, in this case, the approximating function is calculated as a non-linear function of the weights $\theta$. More particularly, if a three-level predictive neural network is considered, with a hidden level comprised of D nodes and an input level comprised of M nodes, the output k can be calculated as:

$$y_k(x, \theta) = \sigma\left(\sum_{j=1}^{M} \vartheta_{k,j}^2 \cdot h\left(\sum_{i=1}^{D} \vartheta_{j,i}^1 \cdot x_i + \vartheta_{j,0}^1\right) + \vartheta_{k,0}^2\right),$$

where x corresponds to the inputs of the neural network, $\theta$ is the set of weights in the neural network, h is the activation function of the hidden nodes (a differentiable non-linear sigmoid function such as the logistic sigmoid or tangent hyperboloid), and $\sigma$ is the activation function (the identity function is used here) of the output nodes.

The invention is thus concerned with a method for determining a resource allocation which implements the previously described reinforcement learning to determine the optimum resource allocation plan for a given state of the telecommunication system. This method can be implemented by a computer program product. The invention is also concerned with the exploitation of this learning and thus relates to a packet scheduling method comprising at each transmission time interval, selecting a resource allocation plan and a transmission resource allocation to the data flows in accordance with the selected resource allocation plan. This selection is made by querying a look up table the content of which results from the implementation of the reinforcement learning and which makes it possible to identify, from the current state of the multi-access telecommunication system, the resource allocation plan to be selected. The invention extends to a computer program product comprising program code instructions for executing the scheduling method when said program is executed by a computer, as well as a node of a multi-access telecommunication system which comprises a look up table the content of which results from the implementation of the reinforcement learning and a planner configured to, at each transmission interval, query the look up table to identify, from the current state of the multi-access telecommunication system, a resource allocation plan, and make a transmission resource allocation to the data flows in accordance with the identified resource allocation plan.

The invention claimed is:

1. A method for determining a resource allocation for data flows belonging to a plurality of data flow categories in a multi-access telecommunication system sharing a plurality of transmission resources, said method comprising, for a state of the multi-access telecommunication system, a step of determining, by iterations of a reinforcement learning, an optimum resource allocation plan maximising a reward sum, each iteration of the reinforcement learning comprising:

allocating the transmission resources to the data flows according to an iteration resource allocation plan;
   transmitting the data flows by way of the allocated transmission resources;
   for each of the data flow categories, calculating at least one transmission performance indicator of each of the data flows of the data flow category, and comparing, for each packet of the data flow category, the calculated at least one transmission performance indicator with a threshold representative of a quality of service requirement relating to the at least one transmission performance indicator for the data flow category, and
   determining a reward as a function of the result of said comparing for each of the data flows of each of the categories.

2. The method according to claim 1, wherein the iteration resource allocation plan comprises a hierarchisation rule and at least one first and one second scheduling rule, and wherein allocating the transmission resources to the data flows according to the iteration resource allocation comprises two steps consisting in:

a scheduling in the time domain made by a time classifier configured to hierarchise the data flow categories according to the hierarchisation rule into at least one priority category and one secondary category; and
   a scheduling in the frequency domain made by a frequency classifier configured to:
      schedule the data flows of the priority category according to the first scheduling rule and allocate the transmission resources to the data flows of the priority category as they are scheduled; and
      in case of remaining transmission resources, schedule the data flows of the secondary category according to the second scheduling rule and allocate the remaining transmission resources to the data flows of the secondary category as they are scheduled.

3. The method according to claim 2, wherein they reward determined at each iteration of the reinforcement learning is the sum $$\sum_{p=1}^{P} r_p(a_{CT}, u_p),$$

with $r_p(a_{CT}, u_p) = \sum_{i_p=1}^{I_p} \sum_{o=1}^{N_{O_p}} \left(1 - |\bar{x}_{p,o} - x_{p,i_p,o}|\right),$ where P designates the number of data flow categories, $a_{cT}$ the hierarchisation rule, $u_p$ the scheduling rule applied to the data flows of the data flow category p, $I_p$ the number of data flows of the data flow category p, $N_{O_p}$ the number of transmission performance indicators of the data flow category p, $\bar{x}_{p,o}$ the threshold representative of a quality of service requirement relating to the transmission performance indicator o for the data flow category p $x_{p,i_p,o}$ and the transmission performance indicator o of the data flow $i_p$.

4. The method according to claim 1, wherein each iteration of the reinforcement learning comprises:

according to a probability $P_a$, an exploitation selection consisting in selecting as the optimum resource allocation plan the iteration resource allocation plan maximising the reward sum at this stage of iterations; and according to a probability $P_{a*}$, an exploration selection consisting in selecting a resource allocation plan a resource allocation plan different from the iteration resource allocation plan maximising the reward sum at this stage of iterations.

5. The method according to claim 1, wherein the at least one transmission performance indicator is one from a transmission delay, a transmission rate and a transmission loss rate.

6. The method according to claim 1, further comprising, at a transmission time interval, allocating the transmission resources in accordance with the optimum resource allocation plan determined for [[the]] a current state of the multi-access telecommunication system.

7. A non-transitory computer program product comprising program code instructions for executing the method according to claim 1 when said program is executed by a computer.

* * * * *